United States Patent
Wei et al.

(10) Patent No.: US 9,330,667 B2
(45) Date of Patent: May 3, 2016

(54) METHOD AND SYSTEM FOR ENDPOINT AUTOMATIC DETECTION OF AUDIO RECORD

(75) Inventors: Si Wei, Anhui (CN); Guoping Hu, Anhui (CN); Yu Hu, Anhui (CN); Qingfeng Liu, Anhui (CN)

(73) Assignee: iFLYTEK Co., Ltd., Hefei, Anhui (CN)

( * ) Notice: Subject to any disclaimer, the term of this patent is extended or adjusted under 35 U.S.C. 154(b) by 617 days.

(21) Appl. No.: 13/878,818

(22) PCT Filed: Oct. 29, 2010

(86) PCT No.: PCT/CN2010/078223
§ 371 (c)(1),
(2), (4) Date: Apr. 11, 2013

(87) PCT Pub. No.: WO2012/055113
PCT Pub. Date: May 3, 2012

(65) Prior Publication Data
US 2013/0197911 A1    Aug. 1, 2013

(51) Int. Cl.
| | |
|---|---|
| G10L 21/00 | (2013.01) |
| G10L 25/93 | (2013.01) |
| G10L 15/00 | (2013.01) |
| G10L 17/00 | (2013.01) |
| G10L 13/00 | (2006.01) |
| G10L 13/08 | (2013.01) |

(Continued)

(52) U.S. Cl.
CPC .............. G10L 15/265 (2013.01); G10L 25/87 (2013.01); *G10L 15/083* (2013.01)

(58) Field of Classification Search
USPC .................................. 704/210, 215, 248, 253
See application file for complete search history.

(56) References Cited

U.S. PATENT DOCUMENTS

| 4,797,929 A | 1/1989 | Gerson et al. |
| 4,870,686 A | 9/1989 | Gerson et al. |

(Continued)

FOREIGN PATENT DOCUMENTS

| CN | 1425980 | 6/2003 |
| CN | 1431650 A | 7/2003 |

(Continued)

OTHER PUBLICATIONS

J. Sohn, N. S. Kim, and W. Sung, IEEE Signal Process. Lett., vol. 16, No. 1, pp. 1-3, 1999.

(Continued)

*Primary Examiner* — Olujimi Adesanya
(74) *Attorney, Agent, or Firm* — Dority & Manning, P.A.

(57) ABSTRACT

A method and system for endpoint automatic detection of audio record is provided. The method comprises the following steps: acquiring a audio record text and affirming the text endpoint acoustic model for the audio record text; starting acquiring the audio record data of each frame in turn from the audio record start frame in the audio record data; affirming the characteristics acoustic model of the decoding optimal path for the acquired current frame of the audio record data; comparing the characteristics acoustic model of the decoding optimal path acquired from the current frame of the audio record data with the endpoint acoustic model to determine if they are the same; if yes, updating a mute duration threshold with a second time threshold, wherein the second time threshold is less than a first time threshold. This method can improve the recognizing efficiency of the audio record endpoint.

14 Claims, 4 Drawing Sheets

(51) Int. Cl.
*G10L 25/00* (2013.01)
*G10L 15/04* (2013.01)
*G10L 15/26* (2006.01)
*G10L 25/87* (2013.01)
*G10L 15/08* (2006.01)

(56) References Cited

U.S. PATENT DOCUMENTS

| | | | | |
|---|---|---|---|---|
| 4,977,599 | A * | 12/1990 | Bahl | G10L 15/02 704/243 |
| 5,634,086 | A * | 5/1997 | Rtischev | G09B 19/06 434/185 |
| 5,799,065 | A * | 8/1998 | Junqua | G10L 15/08 379/216.01 |
| 6,031,915 | A | 2/2000 | Okano et al. | |
| 6,076,056 | A * | 6/2000 | Huang | G10L 15/08 704/254 |
| 6,163,768 | A | 12/2000 | Sherwood et al. | |
| 6,172,675 | B1 * | 1/2001 | Ahmad | G11B 27/034 704/255 |
| 6,456,970 | B1 * | 9/2002 | Kao | G10L 15/08 704/251 |
| 7,720,683 | B1 * | 5/2010 | Vermeulen | G10L 15/22 704/235 |
| 2006/0053009 | A1 * | 3/2006 | Jeong | G10L 15/30 704/234 |
| 2006/0287859 | A1 | 12/2006 | Hetherington et al. | |
| 2007/0225982 | A1 | 9/2007 | Washio | |
| 2007/0288238 | A1 | 12/2007 | Hetherington et al. | |
| 2008/0228478 | A1 | 9/2008 | Hetherington et al. | |
| 2008/0294433 | A1 | 11/2008 | Yeung et al. | |
| 2009/0204407 | A1 * | 8/2009 | Shields | H04M 3/4933 704/270.1 |
| 2010/0268532 | A1 | 10/2010 | Arakawa et al. | |
| 2010/0312562 | A1 * | 12/2010 | Wang | G10L 13/08 704/260 |
| 2012/0265530 | A1 | 10/2012 | Hetherington et al. | |
| 2012/0303366 | A1 | 11/2012 | Hetherington et al. | |

FOREIGN PATENT DOCUMENTS

| | | |
|---|---|---|
| CN | 1763843 A | 4/2006 |
| CN | 101025981 | 8/2007 |
| CN | 101031958 | 9/2007 |
| CN | 101197084 A | 11/2007 |
| CN | 101308653 A | 7/2008 |
| CN | 101685633 | 3/2010 |
| JP | H09-090994 | 4/1997 |
| JP | 2000035795 | 2/2000 |
| JP | 2005242182 | 9/2005 |
| JP | 2007256482 | 10/2007 |
| JP | 2007266807 A | 10/2007 |
| JP | 2008-508564 | 3/2008 |
| WO | WO 2006125346 | 11/2006 |
| WO | WO 2009/069662 | 6/2009 |

OTHER PUBLICATIONS

European Telecommunications Standards Institute, Speech Processing, Transmission and Quality Aspects (STQ); Distributed speech recognition; Advanced front-end feature extraction algorithm; Compression algorithms, 2007, France.

International Search Report and Report on Patentability for PCT/CN2010/078223, mailing date of Aug. 4, 2011.

Masaki Naito et al., "A Speech Detection Method Using Liklihood of Partial Sentence Hypothesis for Continuous Speech Recognition," Jan. 15, 1997, vol. J80-D-II, 11$^{th}$ Issue, pp. 2895-2903.

JP Appl. No. 2013-535238 Notification of Reasons for Refusal, May 26, 2014.

JP 2013-535238 Office Action of Mar. 3, 2015, 5 pages.

\* cited by examiner

METHOD AND SYSTEM FOR ENDPOINT AUTOMATIC DETECTION OF AUDIO RECORD

CROSS-REFERENCE TO RELATED APPLICATION

The present application claims priority to PCT International Application Serial No. PCT/CN2010/078223 filed on Oct. 29, 2010, which is incorporated by reference herein.

FIELD OF THE INVENTION

The present invention relates to audio record control technology and in particular to automatic detection technology of an endpoint of an audio record.

BACKGROUND OF THE INVENTION

After technical development for many years, a speech assessment related to a text has entered into a practical stage. The speech assessment related to the text refers to that a certain text is read by a user, and a speech assessment system stores pronunciation data of the user, assesses the pronunciation data to give an assessment score, In an existing speech assessment system, a user audio record control is generally performed by user manually. Namely, the audio record starts when the user clicks a preset button of start audio record, and the audio record ends when the user clicks a preset button of end audio record. This audio record control needs the user to manually click for many times, the operation is complicated and the user experience is influenced.

Therefore, a method of an automatic audio record control occurs in the prior art. In the method, a speech assessment system automatically detects whether the state of the user audio record is a pronunciation or mute, and determines the end of the audio record when a user mute duration is more than a preset time threshold. However, in the method of the automatic audio record control, a normal pronunciation pause of the user may be judged as an endpoint of the audio record if the time threshold is set to be shorter, leading to a user voice truncation. Therefore, in the prior art, it is generally to set the time threshold as a larger value, for example 2 seconds or longer, thereby the user needs to wait for a very long time to identify the endpoint of the audio record and end the audio record by the speech assessment system after the user finishes the pronunciation. In this way, the efficiency for identifying the endpoint of the audio record by the speech assessment system is reduced, the efficiency of the speech assessment is decreased and the user experience is influenced.

SUMMARY OF THE INVENTION

In view of this, the technical problem solved by the present invention is to provide a method and system for detecting an endpoint of an audio record, so as to improve the identifying efficiency for the endpoint of the audio record.

Therefore, an embodiment of the present invention employs the following technical solution.

An embodiment of the present invention provides a method for detecting an endpoint of an audio record, which includes presetting a mute duration threshold as a first time threshold; the method further includes:

obtaining an audio record text; determining an acoustic model for a text endpoint of the audio record text; and obtaining each frame of audio record data in turn starting from an audio record start frame of the audio record data;

determining a characteristics acoustic model of a decoding optimal path for an obtained current frame of the audio record data; and determining that the characteristics acoustic model of the decoding optimal path for the current frame of the audio record data is the same as the acoustic model for the endpoint; updating the mute duration threshold to a second time threshold, wherein the second time threshold is smaller than the first time threshold.

The determining an acoustic model for a text endpoint includes:

generating a decoding network corresponding to the text according to the audio record text, and determining a last acoustic model of the decoding network as the acoustic model for the text endpoint.

The determining a characteristics acoustic model of a decoding optimal path for a current frame of the audio record data includes:

extracting an MFCC characteristic corresponding to a preset acoustic model from the current frame of the audio record data to obtain the decoding optimal path for the current frame of the audio record data; and determining a last acoustic model of the decoding optimal path for the current frame of the audio record data as the characteristics acoustic model of the decoding optimal path.

The method further includes: retaining the mute duration threshold as the first time threshold if it is determined that the characteristics acoustic model of the decoding optimal path for the current frame of the audio record data is different from the acoustic model for the endpoint.

The method further includes: after one frame of audio record data is obtained, ending the audio record if the obtained current frame of the audio record data is mute data and a current mute duration is larger than a current mute duration threshold.

The method further includes: before the obtaining each frame of audio record data, receiving the audio record data and determining the audio record start frame of the audio record data.

The determining the audio record start frame of the audio record data includes:

determining in turn whether each frame of the audio record data is the mute data or non-mute data, and using a first frame of the non-mute data as the audio record start frame.

An embodiment of the present invention further provides a system for detecting an endpoint of an audio record; a mute duration threshold is preset as a first time threshold; and the system further includes:

a first determining unit adapted to obtain an audio record text and determine an acoustic model for a text endpoint of the audio record text;

a first obtaining unit adapted to obtain each frame of audio record data in turn starting from an audio record start frame of the audio record data;

a second determining unit adapted to determine a characteristics acoustic model of a decoding optimal path for an obtained current frame of the audio record data; and a threshold determining unit adapted to update the mute duration threshold to the second time threshold if it is determined that the characteristics acoustic model of the decoding optimal path for the current frame of the audio record data is the same as an acoustic model for the endpoint, wherein the second time threshold is smaller than the first time threshold.

The first determining unit includes:

an obtaining subunit adapted to obtain the audio record text;

a network establishing subunit adapted to establish a decoding network corresponding to the text according to the audio record text; and a first characteristic determining subunit adapted to determine a last acoustic model of the decoding network as the acoustic model for the text endpoint.

The second determining unit includes:

an extracting subunit adapted to extract an MFCC characteristic corresponding to a preset acoustic model from the current frame of the audio record data to obtain the decoding optimal path for the current frame of the audio record data; and a second characteristic determining subunit adapted to determine a last acoustic model of the decoding optimal path for the current frame of the audio record data as the characteristics acoustic model of the decoding optimal path.

The threshold determining unit is further adapted to retain the mute duration threshold as the first time threshold if it is determined that the characteristics acoustic model of the decoding optimal path for the current frame of the audio record data is different from the acoustic model for the endpoint.

The system further includes an audio record control unit adapted to end the audio record if it is determined that the obtained current frame of the audio record data is mute data and a current mute duration is larger than a current mute duration threshold.

The system further includes a receiving unit adapted to receive the audio record data and determine the audio record start frame of the audio record data.

The receiving unit includes:

a receiving subunit adapted to receive the audio record data; and a start frame determining subunit adapted to determine in turn whether each frame of the audio record data is the mute data or non-mute data, and use a first frame of the non-mute data as the audio record start frame.

The analysis of the technical effects of the technical solution described above is as follows.

The acoustic model of the text endpoint is compared with the characteristics acoustic model of the decoding optimal path corresponding to the current frame of the audio record data. If they are the same, the user has already finished reading the audio record text, and the mute duration threshold is updated to the second time threshold which is shorter relative to the first time threshold. The audio record ends when the user mute duration is larger than the second time threshold. Thereby, comparing with the prior art, the technical solution of the invention improves the efficiency for identifying the endpoint of the audio record and shortens the duration for which the user needs to wait after the end of the audio record.

DETAILED DESCRIPTION OF THE INVENTION

In the following, an implement of a method and system for detecting an endpoint of an audio record in accordance with embodiments of the present invention will be described in detail in conjunction with the accompanying drawings.

Figure 1:
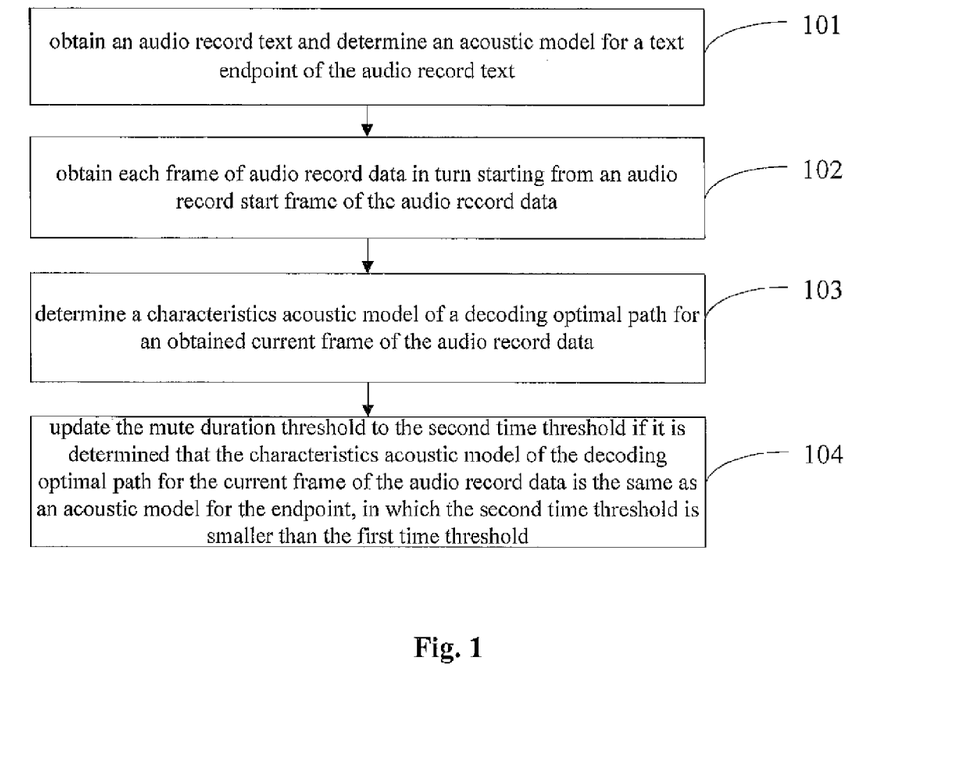
FIG. 1 is a schematic flow chart showing a method for detecting an endpoint of an audio record in accordance with an embodiment of the present invention.

FIG. 1 is a schematic flow chart showing a method for detecting an endpoint of an audio record in accordance with an embodiment of the present invention. As shown in FIG. 1, the method includes:

presetting a mute duration threshold as a first time threshold.

The method further includes the following steps.

Step 101: obtaining an audio record text and determining an acoustic model for a text endpoint of the audio record text, Specifically, the audio record text is a text that a user needs to read during the audio recording. The text may be in any language, such as Chinese and English, which is not limited herein.

Step 102: obtaining each frame of audio record data in turn starting from an audio record start frame of the audio record data.

The audio record data may be voice data which is obtained by an audio record device during the process for recording audio.

Step 103: determining a characteristics acoustic model of a decoding optimal path for an obtained current frame of the audio record data.

The implementing order of Step 101 and Steps 102 to 103 is not limited, as long as they are executed before Step 104.

Step 104: determining that the characteristics acoustic model of the decoding optimal path for the current frame of the audio record data is the same as the acoustic model for the endpoint; updating the mute duration threshold to a second time threshold, in which the second time threshold is smaller than the first time threshold.

Figure 2:
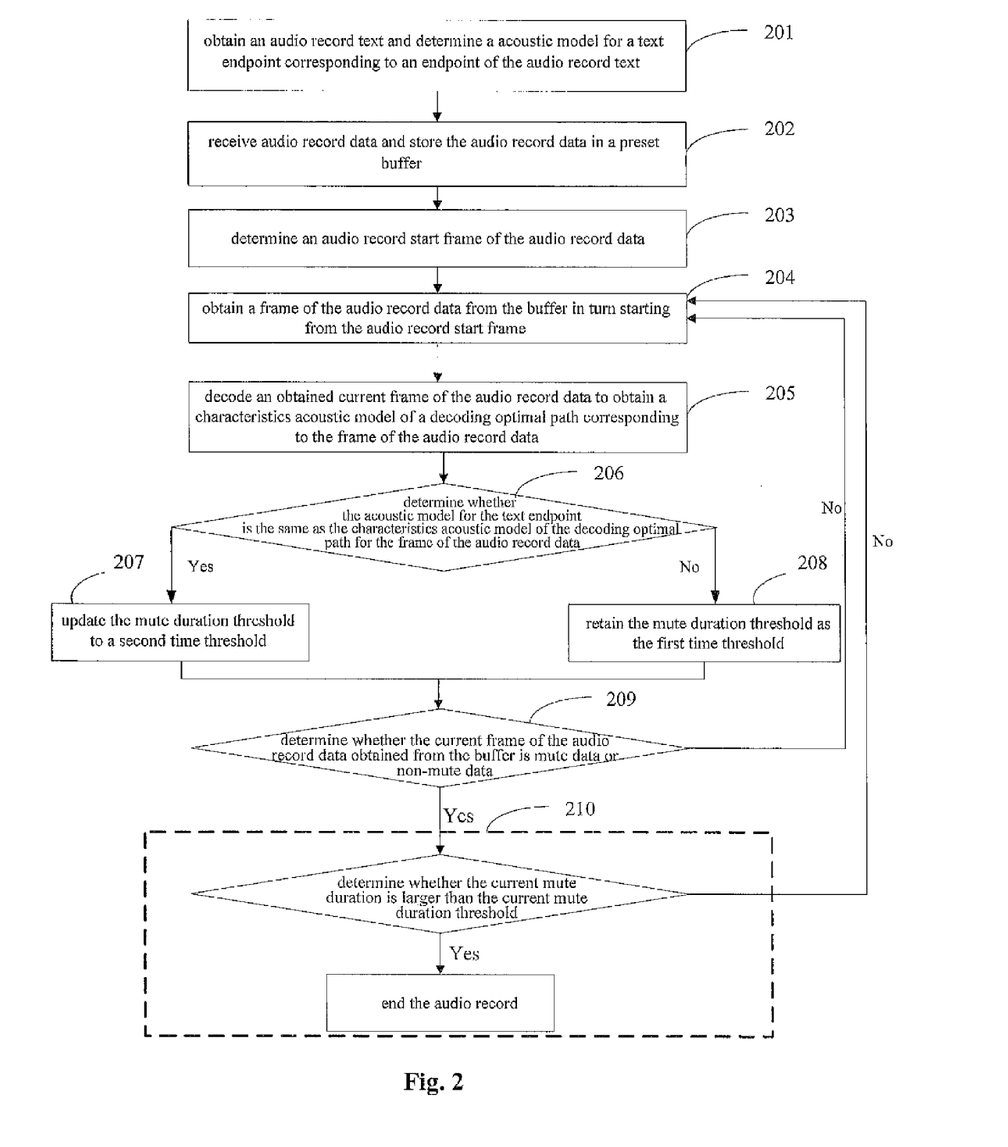
FIG. 2 is a schematic flow chart showing another method for detecting an endpoint of an audio record in accordance with an embodiment of the present invention.

In the method for detecting an endpoint of an audio record as shown in FIG. 1, the acoustic model for the text endpoint is compared with the characteristics acoustic model of the decoding optimal path. If they are the same, the user has already finished reading the audio record text, and the value of the mute duration threshold is updated to the second time threshold which is shorter to the first time threshold. The audio record ends when the user mute duration is larger than the second time threshold. Thereby comparing with the prior art, the method improves the efficiency for identifying the endpoint of the audio record and shortens the duration for which the user needs to wait after the end of the audio record, On the basis of FIG. 1, the method for detecting an endpoint of an audio record in accordance with an embodiment of the present invention will be described in more detail in conjunction with FIG. 2. As shown in FIG. 2, the method includes:

setting a mute duration threshold as a first time threshold.

Step 201: obtaining an audio record text and determining an acoustic model of a text endpoint corresponding to the endpoint of the audio record text.

The determining an acoustic model of a text endpoint corresponding to the endpoint of the audio record text may include:

generating a corresponding decoding network according to the audio record text; and determining a last acoustic model of the decoding network as the acoustic model of the text endpoint.

Specifically, the established decoding network may include a start point mute model of the audio record text, an acoustic model of each word or phrase in the audio record text and a mute model of an endpoint of the audio record text. The acoustic model of the text endpoint may be the mute model of the endpoint of the audio record text.

Figure 4:
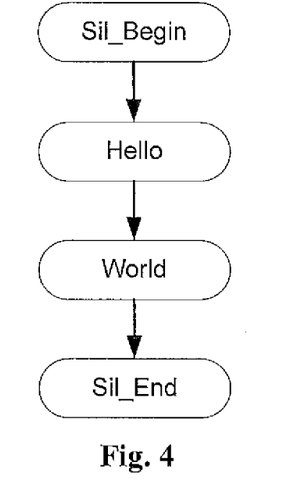
FIG. 4 is an exemplary diagram of a decoding network in accordance with an embodiment of the present invention.

For example, as shown in FIG. 4, for the audio record text "Hello World", the established decoding network includes the mute model Sil_Begin of the start point of the audio record text, the acoustic model of the word "Hello", the acoustic model of the word "World" and the mute model Sil_End of the endpoint of the audio record text. The mute model Sil_End is needed to be obtained in this step.

Step 202: receiving audio record data and storing the audio record data in a preset buffer.

Step 203: determining an audio record start frame of the audio record data.

The determining an audio record start frame of the audio record data may include:

determining in turn whether each frame of the audio record data is mute data or non-mute data, and using a first frame of the non-mute data as the audio record start frame.

The step of determining whether the audio record data is mute data or non-mute data may be implemented by a VAD (Voice Activity Detection) policy. For example, the determining method of mute data or non-mute data which is implemented by the VAD policy is described in the following two passages "A statistical model-based voice activity detection (J. Sohn, N. S. Kim, and W. Sung, IEEE Signal Process. Lett., vol. 16, no. 1, pp. 1-3, 1999)" and "Speech processing, transmission and quality aspects (STQ); distributed speech recognition; advanced front-end feature extraction algorithm; compression algorithms (ETSI, ETSI ES 202 050 Rec., 2002)", and the description thereof is omitted.

A time interval for each frame of the audio record data and a length of a sampling window may be different in different application environments, which are not limited herein. For example, generally the time interval (i.e. a frame offset) may be set to be 10 ms and the length of the sampling window may be set to be 25 ms.

Step 204: obtaining a frame of the audio record data from the buffer in turn starting from the audio record start frame, Step 205: decoding an obtained current frame of the audio record data to obtain a characteristics acoustic model of a decoding optimal path corresponding to the frame of the audio record data.

Specifically, the decoding an audio record data in step 205 may include:

extracting an Mel Frequency Cepstrum Coefficient (MFCC) characteristic corresponding to a preset acoustic model from the current frame of the audio record data to obtain the decoding optimal path corresponding to the frame of the audio record data; and determining the characteristics acoustic model of the decoding optimal path.

In correspondence with Step 201, the last acoustic model of the decoding optimal path may be determined as the characteristics acoustic model of the decoding optimal path.

The preset acoustic model which is used for decoding may be a Mono-Phone model in a phoneme level or a context-dependent Tri-phone model, and may further include a mute model.

The MFCC characteristic is decoded by using the preset acoustic model, so as to obtain the decoding optimal path corresponding to the audio record data. The decoding optimal path may be a path with a maximum likelihood or maximum cost function of the model.

The decoding may be implemented by using Viterbi algorithm etc.

Figure 3:
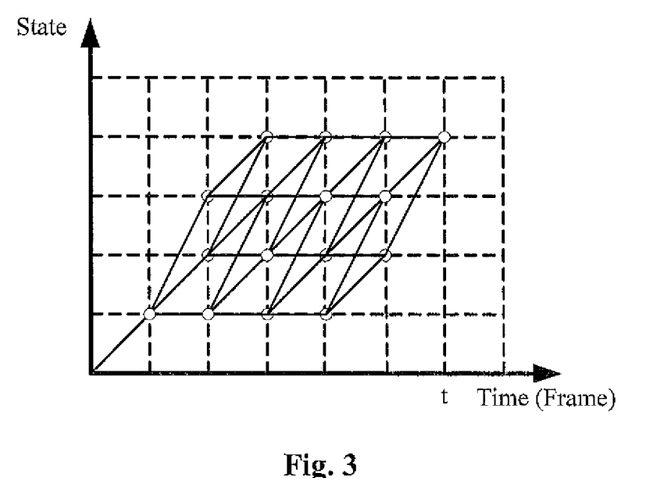
FIG. 3 is a schematic diagram showing a Viterbi algorithm in accordance with an embodiment of the present invention.

For example, the decoding result as shown in FIG. 3 is obtained after the decoding is performed by Viterbi algorithm. According to an embodiment of the present invention, the last acoustic model of the decoding optimal path is an acoustic model corresponding to a last moment t. It is determined that the last acoustic model of the decoding optimal path corresponding to the audio record data is used as the characteristics acoustic model of the decoding optimal path corresponding to the frame of the audio record data.

Step 206: determining whether the acoustic model for the text endpoint is the same as the characteristics acoustic model of the decoding optimal path for the frame of the audio record data, if the same, proceeding to Step 207; otherwise, proceeding to Step 208.

Step 207: updating the mute duration threshold to a second time threshold, in which the second time threshold is smaller than the first time threshold; and proceeding to Step 209.

Step 208: retaining the mute duration threshold as the first time threshold; and proceeding to Step 209.

Step 209: determining whether the current frame of the audio record data obtained from the buffer is mute data or non-mute data, if it is the mute data, proceeding to Step 210; otherwise, returning to Step 204 and obtaining the audio record data for the next frame of the current frame from the buffer.

The audio record data is obtained in frame from the buffer successively. In the step 209, the current frame of the audio record data is a frame of the audio record data which is currently obtained from the buffer and needs to be processed.

The step of determining whether the audio record data is the mute data or the non-mute data may also be implemented by the VAD (Voice Activity Detection) policy. For example, the determining method of mute data or non-mute data which is implemented by the VAD policy is described in the following two passages "A statistical model-based voice activity detection (J. Sohn, N. S. Kim, and W. Sung, IEEE Signal Process. Lett., vol. 16, no. 1, pp. 1-3, 1999)" and "Speech processing, transmission and quality aspects (STQ); distributed speech recognition; advanced front-end feature extraction algorithm; compression algorithms (ETSI, ETSI ES 202 050 Rec., 2002)", and the description thereof is omitted.

Step 210: determining if a current mute duration is larger than a current mute duration threshold, if a current mute duration is larger than a current mute duration threshold, ending the audio record; otherwise, returning to Step 204, obtaining the audio record data for the next frame of the current frame from the buffer, and using the frame of the audio record data as the current frame of the audio record data.

Step 209 only has to be executed between Step 204 and Step 210, the implementing order of Steps 205 to 208 is not limited.

In the step 210, the current mute duration is related to the fact that the successive several frames of the audio record data before the current frame of the audio record data are mute data. Specifically, the current mute duration may be calculated according to the following formula:

The current mute duration=(the serial number of the current frame−the serial number of a frame corresponding to the first frame of the non-mute data before the current frame)*the length of one frame;

For example, in the cast that the (m−1)th frame and the (m−2)th frame of the audio record data are both non-mute data and the (m)th frame to (m+n)th frame of the audio record data are all mute data, the current mute duration is the length of one frame when the (m)th frame of the audio record data is processed; the current mute duration is the length of two frames when the (m+1)th frame of the audio record data is processed; . . . ; the current mute duration is the length of (n+1) frames when the (m+n)th frame of the audio record data is processed.

Furthermore, in step 210, the current mute duration threshold may be the first time threshold or the second time threshold at different moments. Specifically, the current mute duration is always the first time threshold, before it is determined at Step 206 that there is a frame of the audio record data whose characteristics acoustic model is the same as the acoustic model for the text endpoint; and the mute duration threshold is updated to the second time threshold with a shorter time length once it is determined at Step 206 that the characteristics acoustic model of the decoding optimal path for a certain frame is the same as the acoustic model of the text endpoint.

In the method shown in FIG. 2, if it is always determined that the characteristics acoustic model of the decoding optimal path is different from the acoustic model of the text endpoint, it means that the user does not finish reading the audio record text, and at this time the mute duration threshold is the first time threshold. The audio record is ended only when the mute duration kept by the user is larger than the current mute duration threshold (i.e. the first time threshold), so as to ensure that the audio record may be ended automatically even when the user performs an abnormal audio record (for example, a mistake occurs in the reading or the reading is ended medially). If it is determined that the characteristics acoustic model of the decoding optimal path is the same as the acoustic model of the text endpoint, it means that the user has already finished reading the audio record text, and at this time the mute duration threshold is updated to the second time threshold which is the shorter one between the first time threshold and the second time threshold. Thus, the audio record is ended as soon as the user mute duration is larger than the current mute duration threshold (i.e. the second time threshold). In this way, the waiting duration of the user is merely the second time threshold in the case that the user finishes reading the audio record text normally. Therefore, the waiting duration is shortened relative to the first time threshold in the prior art, and the efficiency of identifying the endpoint of the audio record is improved.

However, in the method shown in FIG. 2, in the case that it is determined that the characteristics acoustic model of the decoding optimal path is the same as the acoustic model of the text endpoint in Step 206, although it is determined that the user has finished reading the audio record text, the determination of Step 206 is also performed on each of the subsequent frames of the audio record data subsequently after it is determined that the user has finished reading the audio record text. In this case, the determination step of Step 206 is not necessary. For example, if the determining result for the Nth frame of the audio record data is the same at Step 206, it is means that the user has already finished reading the audio record text in the Nth frame of the audio record data. In this case, for the N+1th frame and the subsequent several frames of the audio record data, it is not necessarily to perform the determination of Step 206. Therefore, in the practical application, for the purpose of further improving the efficiency of identifying and processing the endpoint of the audio record, Steps 209 to 210, rather than Steps 205 to 208, are performed on the subsequent frames of the audio record data after it is determined that the characteristics acoustic model of the audio record data is the same as the acoustic model of the text endpoint at the first time in Step 206. Namely, it is only determined whether the obtained current frame of the audio record data is the mute data or not, and the mute duration is determined if the obtained current frame of the audio record data is the mute data.

Figure 5:
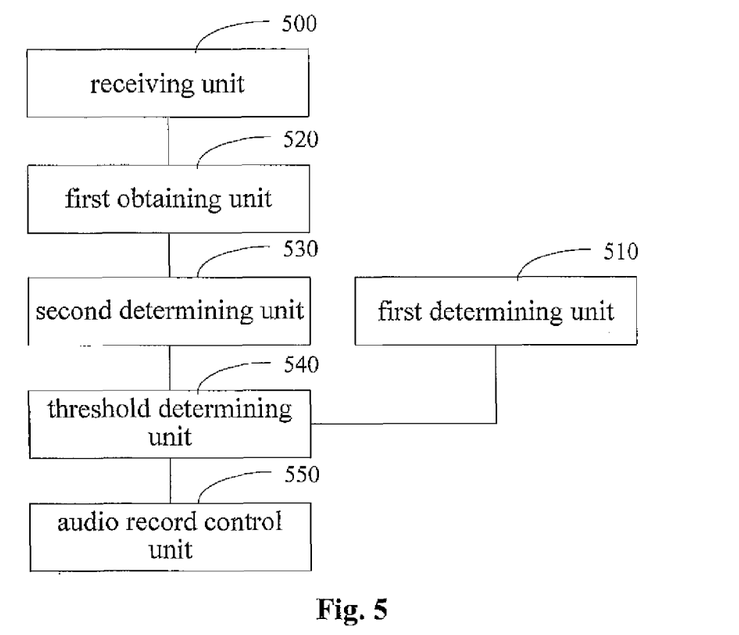
FIG. 5 is a structural schematic diagram showing a system for detecting an endpoint of an audio record in accordance with an embodiment of the present invention.

Corresponding to the method for detecting an endpoint of an audio record, a system for detecting an endpoint of an audio record is provided according to an embodiment of the present invention, as shown in FIG. 5. In the system, a mute duration threshold is preset as a first time threshold; and the system further includes:

a first determining unit 510 adapted to obtain an audio record text and determine an acoustic model for a text endpoint of the audio record text;

a first obtaining unit 520 adapted to obtain each frame of audio record data in turn starting from an audio record start frame of the audio record data;

a second determining unit 530 adapted to determine a characteristics acoustic model of a decoding optimal path for an obtained current frame of the audio record data; and a threshold determining unit 540 adapted to update the mute duration threshold to the second time threshold if it is determined that the characteristics acoustic model of the decoding optimal path for the current frame of the audio record data is the same as an acoustic model for the endpoint, in which the second time threshold is smaller than the first time threshold.

Preferably, the threshold determining unit 540 is further adapted to retain the mute duration threshold as the first time threshold if it is determined that the characteristics acoustic model of the decoding optimal path for the current frame of the audio record data is different from the acoustic model for the endpoint.

Furthermore, as shown in FIG. 5, the system may further include:

an audio record control unit 550 adapted to end the audio record if it is determined that the obtained current frame of the audio record data is mute data and the current mute duration is larger than the current mute duration threshold.

Figure 6:
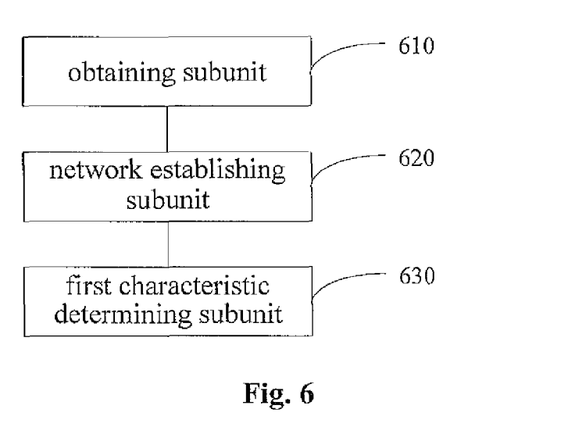
FIG. 6 is a structural schematic diagram showing an implement of an unit in a system for detecting an endpoint of an audio record in accordance with the embodiment of the present invention.

Preferably, as shown in FIG. 6, the first determining unit 510 may include:

an obtaining subunit 610 adapted to obtain the audio record text;

a network establishing subunit 620 adapted to establish a decoding network corresponding to the text according to the audio record text; and a first characteristic determining subunit 630 adapted to determine a last acoustic model of the decoding network as the acoustic model for the text endpoint.

Figure 7:
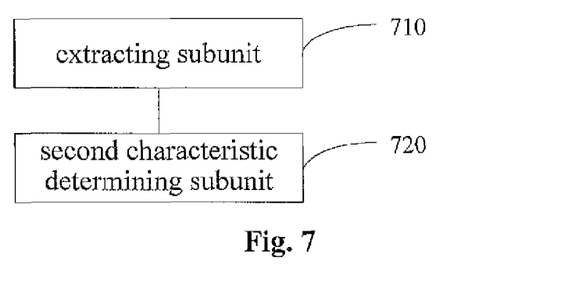
FIG. 7 is a structural schematic diagram showing an implement of another unit in a system for detecting an endpoint of an audio record in accordance with the embodiment of the present invention.

Preferably, as shown in FIG. 7, the second determining unit 520 may include:

an extracting subunit 710 adapted to extract an MFCC characteristic corresponding to a preset acoustic model from the current frame of the audio record data to obtain the decoding optimal path for the current frame of the audio record data; and a second characteristic determining subunit 720 adapted to determine a last acoustic model of the decoding optimal path for the current frame of the audio record data as the characteristics acoustic model of the decoding optimal path.

As shown in FIG. 5, the system may further include:

a receiving unit 500 adapted to receive the audio record data and determine the audio record start frame of the audio record data.

Preferably, the receiving unit 500 may include:

a receiving subunit adapted to receive the audio record data; and a start frame determining subunit adapted to determine in turn whether each frame of the audio record data is the mute data or non-mute data, and use a first frame of the non-mute data as the audio record start frame.

The step of determining whether the audio record data is mute data or non-mute data as described above may be implemented by a VAD policy, and the description thereof is omitted.

In the system for detecting an endpoint of an audio record as shown in FIGS. 5 to 7, the threshold determining unit compares the characteristics acoustic model of the decoding optimal path with the acoustic model for the text endpoint. If they are the same, it means that the user has already finished reading the audio record text, and the mute duration threshold is updated to the second time threshold which is shorter than the first time threshold. Then, the audio record ends when an audio record control unit determines that the current mute duration is larger than the second time threshold. In this way, comparing with the prior art, the system shortens the waiting duration of the user after the audio record is ended, improves the efficiency for identifying the endpoint of the audio record and enhances the user experience.

The method and system for detecting an endpoint of an audio record according to the embodiments of the present invention may not only be applied in a speech assessment system but also be applied in other case where a known text needs to be read to perform the audio record.

It is appreciated by those skilled in the art that the process of implementing the method for detecting an endpoint of an audio record according to the above-mentioned embodiment may be implemented by a hardware corresponding to a program instruction. The program may be stored in a readable storage medium, and the program executes corresponding steps in the method when being executed. The storage medium may be ROM/RAM, a magnetic disc, an optical disc, etc.

Those described above are merely the preferred embodiments of the present invention. It should be noted for those skilled in the art that several improvements and modifications may be made without departing from the principle of the present invention and the improvements and modifications are within the scope of protection of the present invention.

What is claimed is:

1. A method for detecting an endpoint of an audio record, comprising presetting a mute duration threshold as a first time threshold; wherein the method further comprises:
   obtaining an audio record text; determining an acoustic model for a text endpoint of the audio record text; and obtaining each frame of audio record data in turn starting from an audio record start frame of the audio record data;
   determining a characteristics acoustic model of a decoding optimal path for an obtained current frame of the audio record data; and
   determining that the characteristics acoustic model of the decoding optimal path for the current frame of the audio record data is the same as the acoustic model for the endpoint;
   updating the mute duration threshold to a second time threshold, wherein the second time threshold is smaller than the first time threshold.

2. The method according to claim 1, wherein the determining an acoustic model for a text endpoint comprises:
   generating a decoding network corresponding to the text according to the audio record text, and determining a last acoustic model of the decoding network as the acoustic model for the text endpoint.

3. The method according to claim 2, wherein the determining a characteristics acoustic model of a decoding optimal path for a current frame of the audio record data comprises:
   extracting an MFCC characteristic corresponding to a preset acoustic model from the current frame of the audio record data to obtain the decoding optimal path for the current frame of the audio record data; and
   determining a last acoustic model of the decoding optimal path for the current frame of the audio record data as the characteristics acoustic model of the decoding optimal path.

4. The method according to claim 1, further comprising:
   retaining the mute duration threshold as the first time threshold if it is determined that the characteristics acoustic model of the decoding optimal path for the current frame of the audio record data is different from the acoustic model for the endpoint.

5. The method according to claim 1, wherein after one frame of audio record data is obtained, the method further comprises:
   ending the audio record if it is determined that the obtained current frame of the audio record data is mute data and a current mute duration is larger than a current mute duration threshold.

6. The method according to claim 1, wherein before the obtaining each frame of audio record data, the method further comprises:
   receiving the audio record data and determining the audio record start frame of the audio record data.

7. The method according to claim 6, wherein the determining the audio record start frame of the audio record data comprises:
   determining in turn whether each frame of the audio record data is the mute data or non-mute data, and using a first frame of the non-mute data as the audio record start frame.

8. A system for detecting an endpoint of an audio record, wherein a mute duration threshold is preset as a first time threshold; and the system further comprises:
   a first determining unit adapted to obtain an audio record text and determine an acoustic model for a text endpoint of the audio record text;
   a first obtaining unit adapted to obtain each frame of audio record data in turn starting from an audio record start frame of the audio record data;
   a second determining unit adapted to determine a characteristics acoustic model of a decoding optimal path for an obtained current frame of the audio record data; and
   a threshold determining unit adapted to update the mute duration threshold to the second time threshold if it is determined that the characteristics acoustic model of the decoding optimal path for the current frame of the audio record data is the same as an acoustic model for the endpoint, wherein the second time threshold is smaller than the first time threshold.

9. The system according to claim 8, wherein the first determining unit comprises:
   an obtaining subunit adapted to obtain the audio record text;
   a network establishing subunit adapted to establish a decoding network corresponding to the text according to the audio record text; and
   a first characteristic determining subunit adapted to determine a last acoustic model of the decoding network as the acoustic model for the text endpoint.

10. The system according to claim 9, wherein the second determining unit comprises:
   an extracting subunit adapted to extract an MFCC characteristic corresponding to a preset acoustic model from the current frame of the audio record data to obtain the decoding optimal path for the current frame of the audio record data; and
   a second characteristic determining subunit adapted to determine a last acoustic model of the decoding optimal path for the current frame of the audio record data as the characteristics acoustic model of the decoding optimal path.

11. The system according to claim 8, wherein the threshold determining unit is further adapted to retain the mute duration threshold as the first time threshold if it is determined that the characteristics acoustic model of the decoding optimal path for the current frame of the audio record data is different from the acoustic model for the endpoint.

12. The system according to claim 8, further comprising:
   an audio record control unit adapted to end the audio record if it is determined that the obtained current frame of the audio record data is mute data and a current mute duration is larger than a current mute duration threshold.

13. The system according to claim 8, further comprising:
   a receiving unit adapted to receive the audio record data and determine the audio record start frame of the audio record data.

14. The system according to claim 13, wherein the receiving unit comprises:
   a receiving subunit adapted to receive the audio record data; and
   a start frame determining subunit adapted to determine in turn whether each frame of the audio record data is the mute data or non-mute data, and use a first frame of the non-mute data as the audio record start frame.

* * * * *